Patented Jan. 7, 1941

2,228,161

UNITED STATES PATENT OFFICE 2,228,161

PROCESS FOR PRODUCING N-SUBSTITUTION PRODUCTS OF CYCLIC AMIDINES

Werner Zerweck and Karl Keller, Frankfort-on-the-Main-Fechenheim, Germany, assignors to I. G. Farbenindustrie Aktiengesellschaft, Frankfort-on-the-Main, Germany No Drawing. Application June 13, 1938, Serial No. 213,418. In Germany June 22, 1937

1 Claim. (Cl. 260—248)

Our present invention relates to a process for producing N-substitution products of cyclic amidines.

In order to prepare cyclic amidine derivatives substituted at the nitrogen atoms of the amino groups previously it was necessary to use processes dependent on the interaction of the corresponding halogen compounds or esters and primary or secondary amines. When attempting to obtain such substitution products by heating a mixture of the easily accessible amidines themselves and the amino compounds in question with splitting off of ammonia, apparently such a reaction could be carried out on a tolerably satisfactory scale only in few cases.

According to our present invention such substitution products are readily obtainable by heating at comparatively high temperatures a mixture of the cyclic amidines which at least twice contain the group

and of the salts, for instance hydrochlorides of the amine compounds in question, containing at least one replaceable hydrogen atom, instead of the amino compounds themselves. In an alternative form of the process the salts, e. g. hydrochlorides of the cyclic amidines may be decomposed with the amino compounds. According to the molecular proportions of the components one or more (up to the total number present) amino groups of the cyclic amidines are substituted.

The decomposition reaction is advantageously carried out by finely powdering a mixture of the amidine and the salt of the amino compound and then subjecting it to a baking process at temperatures ranging from about 150 to 200° C. One may work likewise in the presence of a diluent. The crude products thus obtained can be easily transformed into the free bases by means of alkalies. From the mixture thus formed the single substitution products can be isolated according to the usual methods of separation, e. g. by recrystallization.

Under the term cyclic amidines as employed above there are included as said above compounds containing at least twice the group

within a ring system, such as melamine, di- and triamino-pyrimidine, guanazole and amines of the pyrro-diazole series.

In order to further illustrate our invention the following examples are given, the parts being by weight.

Example 1

A mixture of 63 parts of melamine and 67 parts of monomethyl amine-hydrochloride (molecular proportion 1:2) is finely powdered and then heated for about 6 hours at about 190 to 195° C. The white crystal mass formed is dissolved in hot water with the addition of a small quantity of hydrochloric acid. Some impurities may be removed by filtration and the filtrate is made alkaline by means of ammonia and allowed to cool down. Unchanged melamine which separates at first is filtered off and the filtrate is evaporated. After cooling down about 50 to 55 parts of N,N'-dimethylmelamine of the formula

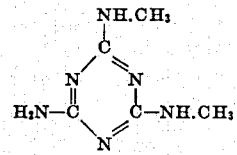

(decomposing at 260 to 262° C.) are obtained. From the mother liquor by evaporating or extracting with ether a small amount of trimethylmelamine of melting point 130° C. can be obtained.

Example 2

A mixture of 30 parts of melamine and 13.5 parts of dimethylamine hydrochloride (molecular proportion 1:⅔, i. e. melamine in excess) is heated for some hours at about 180° C. The crystalline mass thus obtained contains the hydrochlorides of melamine, a certain quantity of N.N'-tetramethylmelamine and as the main product of N-dimethylmelamine of the formula

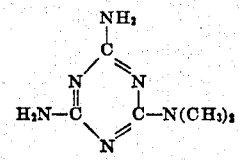

After decomposition of the hydrochlorides by means of ammonia or a caustic soda solution the single components of the mixture can be obtained in a pure state by recrystallization. The aforesaid N-dimethylmelamine forms colorless crystals of about 307 to 308° C. melting point, the N.N'-tetramethylmelamine colorless crystals of about 222° C. melting point.

Example 3

13 parts of melamine are mixed with 61 parts of octadecylamine hydrochloride (molecular proportion 1:2) and the mixture is heated for about 4 hours at about 200 to 210° C. The reaction mass is pulverized, digested with aqueous ammonia, then filtered off and the residue is washed out with water and extracted with alcohol. The unchanged melamine which is insoluble in alcohol is removed by filtration and the filtrate is cooled down. In this manner with a good yield the N.N'-dioctadecylmelamine of the formula

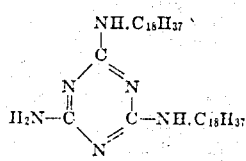

is obtained as colorless crystals of 72 to 75° C. melting point.

When working with a molecular proportion of melamine to octadecylamine hydrochloride of 1:1 besides unchanged melamine a mixture of mono- and dioctadecylmelamine is obtained.

Example 4

One molecular proportion of melamine is mixed with more than three molecular proportions of aniline hydrochloride and the mixture is heated for about 5 hours at about 180 to 190° C. When cool the reaction mass is pulverized, digested with a dilute caustic soda solution and subjected to a steam distillation. When the excess of aniline has been distilled off the residue is filtered off. With a good yield a crystalline powder is obtained which may be purified for instance by recrystallization from butylalcohol. It is the symmetrical triphenylmelamine of the formula

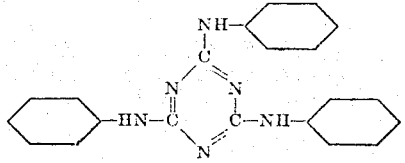

of 225° C. melting point.

Example 5

40.5 parts of melamine-mono-hydrochloride obtained by dissolving melamine in a moderately concentrated hot hydrochloric acid and filtering off the crystals which separate after cooling down the solution, are mixed with about 90 parts of aniline and the mixture is heated while stirring for some hours at 180 to 190° C. When cool a caustic soda solution is added until a slightly alkaline reaction and the reaction mass is subjected to a steam distillation, whereby the excess of aniline is distilled off. From the remaining liquor the residual powder is filtered off, dried and extracted with toluene. The remaining minor party is proved by analysis as diphenylmelamine. From the cool filtrate the main product crystallizes consisting probably besides a little quantity of normal triphenylmelamine (cf. the foregoing example) substantially of triphenylisomelamine of the probable formula

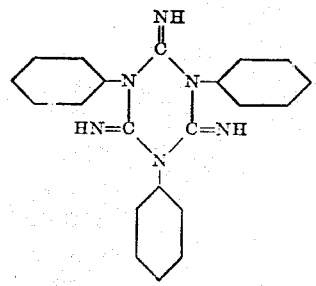

of 185° C. melting point, which can be easily separated from the normal triphenylmelamine on account of its solubility in ether.

Example 6

A mixture of 42.2 parts of phenylguanazole-monohydrochloride and about 46 parts of aniline is heated for some hours at 180 to 185° C. in an apparatus provided with a reflux condenser. When cooled down to about 50° C. a quantity of a caustic soda solution corresponding to the amount of the aforesaid monohydrochloride is added and the reaction mass is subjected to a steam distillation until the excess of aniline has been distilled off. From the hot solution an insoluble oil is separated. When cool the oil solidifies to a brownish hard mass, which consists of a mixture of N-phenyl-phenylguanazole and a little quantity of N.N'-diphenyl-phenylguanazole. The phenyl-N-phenylguanazole of the probable formula

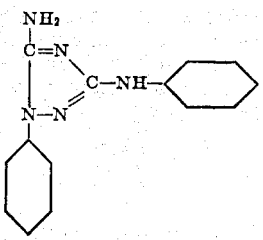

colorless crystals of about 160° C. melting point, is isolated by extracting the aforesaid mixture with a dilute hydrochloric acid, precipitating the filtrate with a caustic soda solution and filtering off the precipitating white powder, which may be further purified by recrystallization from alcohol.

Example 7

4 parts of 2,4-diaminoquinazoline are mixed with 11.5 parts of butylamine hydrochloride and the mixture is heated in a closed vessel for about 5 hours at 185 to 190° C. When cool the formed crystal mass is stirred with a little water and 5 to 6 parts of a caustic soda solution of 33° Bé. and then extracted with ether. The ethereal solution is separated off and dried by the addition of sodium sulfate. After having filtrated and distilled off the ether about 6 parts of a light syrupy mass is obtained which solidifies when cooled to a crystalline mass. The product thus obtained corresponds as proved by analysis with the formula

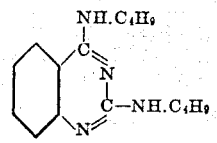

When decomposing in the same manner 5 parts of 2,4,6-amino-pyrimidine with 10 parts of monomethylamine hydrochloride and isolating the condensation product in a similar manner as described above about 6 parts of a yellow crystalline product are obtained which according to analysis probably corresponds with the formula

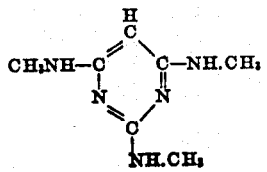

We claim:

A process of producing N-substitution products of cyclic amidines which consists in heating to about 150 to 200° C. melamine and an amine selected from the class consisting of primary and secondary aliphatic and aromatic amines, one of said components being in the form of a mineral acid salt.

WERNER ZERWECK.
KARL KELLER.